Nov. 16, 1937.  C. L. HALL  2,099,649

CEILING INSTALLATION AND FASTENER FOR THE SAME

Filed March 17, 1934

Inventor:
Charles L. Hall.
by Walter S. Jones Atty.

Patented Nov. 16, 1937

2,099,649

UNITED STATES PATENT OFFICE 2,099,649

CEILING INSTALLATION AND FASTENER FOR THE SAME

Charles L. Hall, Detroit, Mich., assignor to United-Carr Fastener Corporation, Cambridge, Mass., a corporation of Massachusetts Application March 17, 1934, Serial No. 716,163

6 Claims. (Cl. 296—137)

My invention aims to provide improvements in ceiling installations and fasteners for the same.

In the drawing which illustrates preferred embodiments of my invention:—

Referring now to the particular embodiment of my invention illustrated by Figs. 1 through 6 of the annexed drawing, I have shown a fastener-attached ceiling particularly, though not exclusively, adapted for use in connection with motor vehicle roof structures.

Figure 1:
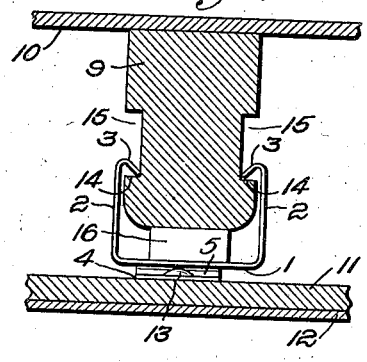
Figure 1 is a vertical section through a portion of a roof of a motor vehicle body.
Figure 5:
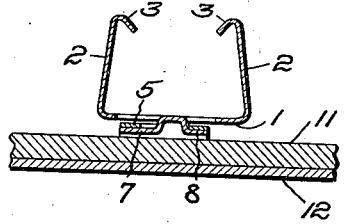
Fig. 5 is a section taken on the line 5—5 of Fig. 2 with the roof structure omitted.
Figure 6:
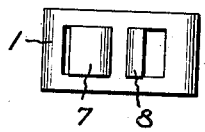
Fig. 6 is a bottom view of the stud structure shown in Figs. 1, 2 and 5.

My improved fastener for use in attaching the ceiling form is preferably formed from a single piece of sheet metal bent up to provide a stud structure having a flat base 1 and a pair of yieldable legs 2—2 cooperating with the base and extending from opposite ends thereof to provide a substantially U-shaped structure, as clearly illustrated in Figs. 1 and 5. At the free ends of the legs 2—2 I have provided hook-like portions 3—3 bent toward each other. My improved fastener also includes a stud-attaching member in the form of a plate 4 (Figs. 3 and 4) formed from sheet metal and having a central raised portion 5 provided with an aperture 6. In order to attach the stud member to the attaching plate I have provided a pair of hook-like members 7 and 8 extending from the base 1 in the opposite direction from the legs 2—2 (Fig. 5). The aperture 6 in the attaching plate 4 is preferably rectangular in outline and the hook-like projection 7 is longer than the projection 8 so that it may be tipped into the aperture 6 and make substantial engagement with the raised portion 5 of the attaching member 4. With this arrangement the stud may be engaged with and disengaged from the plate while the plate is attached to a supporting structure, as will be more fully hereinafter described.

Figure 2:
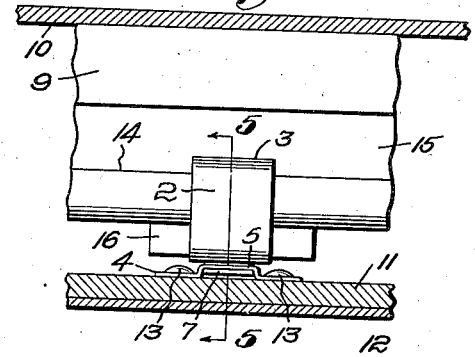
Fig. 2 is a side elevation of the installation shown in Figure 1.
Figure 3:
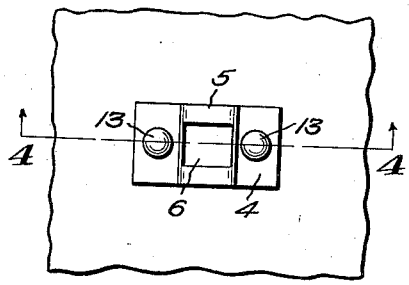
Fig. 3 is a plan view of a portion of a ceiling form showing a fastener-attaching plate in position.
Figure 4:
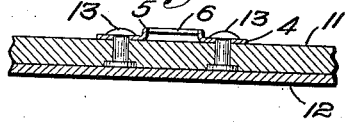
Fig. 4 is a section taken on the line 4—4 of Fig. 3.

The installation (Figs. 1 and 2) with which my improved fasteners may be used to advantage includes a framework and roof covering of any usual design but for the purpose of illustrating my invention I have shown only a portion of one of the rib pieces 9 of the framework and a portion of the roof covering 10. I have also shown a portion of a ceiling which, in this instance, is in the nature of a form of cardboard or the like 11 preferably cut to cover the entire ceiling in one piece and covered at one side with a flexible upholstery material 12 which may match the material of other upholstery work used in a motor vehicle body construction. As illustrated in Figs. 1 and 2, the fastener-attaching plate is secured against that side of the ceiling form 11 which faces the rib piece and is preferably secured in position by rivets 13—13, as clearly shown in Fig. 4. The stud structure is attached to the fastener-attaching plate and the leg portions 2—2 span the rib 9 and the hook-like portions 3—3 engage shoulders 14—14 extending longitudinally of the rib piece 9, as clearly shown in Fig. 1. These shoulders 14—14 are preferably formed by cutting grooves 15—15 in opposite sides of the rib. In some instances, depending somewhat on the material used, it will be necessary to prevent rattle between the parts by inserting between the bottom of the rib 9 and the base 1 of the fastener a readily compressible strip 16 which may be of felt, rubber, or other suitable material. These strips are only necessary when the ceiling material is not bent to create a constant tension on the fasteners.

Assuming that the parts of the installation are ready for assembly of the fastener and the ceiling, the operations preferably take place as follows: First the ceiling form 11 is constructed, the fastener-attaching plate, or plates, is secured to one face thereof by the rivets 13 and then the covering material 12 is applied to the form 11 thereby finishing one face thereof. In this form the ceiling structures may be shipped from one place to another and handled quite readily before the fastener members are attached. Usually the fastener members are attached just prior to the ceiling being put into place. Each stud member is secured to an attaching plate 4 by first inserting the longest hook-like member 7 into the aperture 6 and then entering the shortest hook-like member 8 into the aperture 6 and sliding the stud member relative to the attaching plate 4 so that both hook-like members may be engaged beneath the raised portion 5, as clearly shown in Fig. 5. In this position it will be noted that the stud member may shift laterally to a limited extent because of the relative dimensions of the aperture 6 and those portions of the hook-like members 7 and 8 which pass through the aperture. Furthermore, because of the cooperating rectangular shapes provided by the projection 5 and the outwardly turned portions of the hook-like members 7 and 8, the stud is prevented from turning relative to the attaching plate when it is secured thereto. After the desired number of fastener studs are attached the ceiling is ready to be moved into position by approaching it toward the roof structure and pressing it into position. During this operation the yieldable legs 2—2 of each of the fastener studs straddle the rib-like member 9 and as they are brought into contact with the sides of the rib-like member 9 they are forced apart and ride up the sides until the hook-like portions 3—3 snap into the grooves 15—15 and engage the shoulders 14—14, as shown in Figs. 1 and 2. In order to permit substantial manufacturing tolerances, the relative sizes of the parts are such that there is a space between the bottom of a rib-like member and the inner face of the ceiling form so that there will be no question but that the ceiling may be moved a sufficient distance toward the frame structure to make positive engagement between the hook-like portions 3—3 and the shoulder portions 14—14. In order to prevent relative accidental movement of the ceiling structure toward and away from the roof structure after the parts have been attached, I use compressible strips 16 which are preferably cemented or otherwise attached to the bottom edges of the rib-like members 9 in the proper positions so that they will be engaged by the bases of the fastener studs, as shown in Figs. 1 and 2.

Figure 7:
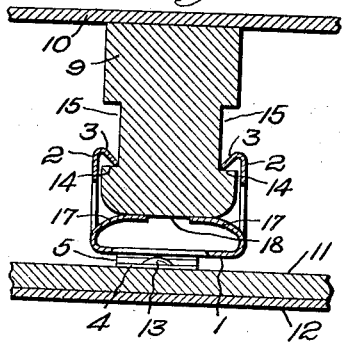
Fig. 7 is a section similar to that shown in Figure 1 but with a modified form of stud structure.
Figure 8:
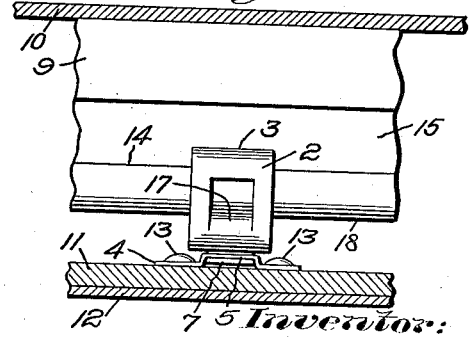
Fig. 8 is a side elevation of the installation illustrated in Fig. 7.

In order to simplify the assembly operation and reduce the parts to a minimum, I have shown a structure in Figs. 7 and 8 which eliminates the necessity for using the compressible strips 16. In this structure I have provided yieldable fingers 17—17 formed from the material of the yieldable legs 2—2 and bent inwardly toward each other in spaced relation to the hook-like portions 3—3. Thus when the fastener studs are snapped into engagement with the rib members 9 the material of the rib member is gripped between the yieldable fingers 17—17 and the inwardly turned ends of the hook-like portions 3—3, as clearly shown in Fig. 7. Any variation in the distance between the shoulders 14—14 of the rib member 9 and the lower face 18 (Fig. 7) may be compensated for by the fact that the fingers 17—17 are yieldable and will adjust themselves to such variations.

My improved structure has proved itself to be entirely satisfactory and is particularly desirable because the ceilings may be easily and quickly installed. Furthermore the fastener structures are simple, relatively inexpensive and particularly adaptable for this type of work.

While I have illustrated and described preferred embodiments of my invention, I do not wish to be limited thereby, because the scope of my invention is best defined by the following claims.

I claim:

1. A fastener structure of the class described including an attaching plate having a raised portion provided with an aperture therethrough, a snap fastener stud member having a base provided with hook-like projections of unequal length to permit insertion through the aperture by a relative tipping action and to engage beneath the raised portion, said hook-like projections and the raised portion of said attaching plate being shaped and arranged to prevent relative rotation and stud means for snap fastening engagement with a cooperating stud-receiving means, said stud means extending from the opposite side of said base from said hook-like projections.

2. A fastener stud of the class described formed from sheet metal and having a base, a pair of independent yieldable leg portions extending from opposite ends of said base and having inwardly-bent hook-like portions at their free ends for spring engagement with a shouldered surface of the member with which said stud is attached, and a yieldable finger portion integral with each of said leg portions, said fingers being yieldable independently of said leg portions and located between the hook-shaped end and the base, each of said finger portions extending from each of said leg portions toward the other leg portion in a way to enter into spring engagement with the lower surface of said member opposed to said shouldered surface to maintain said member in spaced relation to the base of said stud.

3. A ceiling installation for motor vehicle bodies and the like comprising, in combination, a roof having rib pieces in its framework, a ceiling form covering the underside of said roof adjacent to said rib pieces, an attaching member secured to that side of said ceiling form adjacent to the rib pieces, a snap fastener member held in position by said attaching member and being in snap fastener engagement with said rib pieces, said attaching member having an apertured portion spaced from the ceiling form, and said snap fastener member having opposed hook-like portions passing through the aperture and engaging beneath that portion of the attaching member spaced from the ceiling form in such a way that said fastener member may be hooked into and out of engagement with the attaching member after the attaching member has been secured to the ceiling form, and the dimensions of the hook-like portions of said snap fastener member and the aperture of said attaching member being such as to permit relative lateral shifting movement of the fastener member relative to the attaching member.

4. A fastener structure of the class described including an attaching plate having an aperture therethrough, a snap fastener stud member having a base provided with preformed hook-like projections passing through the aperture in the attaching plate by a relative tipping action and engaging said plate to secure the two members together, snap fastener members adapted to engage a cooperating stud-receiving means, and the dimensions of the hook-like projections of the base of said stud member and the aperture of said attaching plate being such as to permit relative lateral shifting movement of the fastener stud member relative to the attaching plate.

5. A ceiling installation for motor vehicle bodies and the like comprising a roof having rib members in its framework, a ceiling form covering the underside of said roof adjacent to said rib members and snap fastener means for attaching said ceiling form to said rib members comprising an attaching plate securely attached to one side of the ceiling form and provided with an apertured portion spaced from said form, a fastener stud member having a base provided with hook-like projections passed through the aperture in the attaching plate, said hook-like projections being confined between said plate and ceiling form, and yieldable snap fastener fingers on said base adapted for engagement with said rib members.

6. A ceiling installation for motor vehicle bodies and the like comprising a roof having rib members in its framework, a non-metallic ceiling form covering the underside of said roof adjacent to said rib members and snap fastener means for attaching said ceiling form to said rib members, said fastener means comprising an attaching plate securely attached to one side of the ceiling form, and provided with a portion spaced from said form, a fastener member having a base formed with hook-like portions, adapted with said base, to engage opposite faces of the spaced portion of said attaching plate, with the portions underlying the attaching plate confined between the plate and ceiling form, and yieldable snap fastener members on said base adapted for engagement with said rib members.

CHARLES L. HALL.